[19] United States Patent  [15] 3,705,426
Marcum, Jr. et al.  [45] Dec. 12, 1972

[54] PRESSURE SUIT JOINT SYSTEM
[72] Inventors: Alfred L. Marcum, Jr., Centerville, Ohio; Marvin Burns, Wilmette; Richard A. Rodzen, Bolingbrook, both of Ill.
[73] Assignee: The United States of America as represented by the Secretary of the Air Force
[22] Filed: Aug. 27, 1971
[21] Appl. No.: 175,532

[52] U.S. Cl. ................................................2/2.1 A
[51] Int. Cl. ............................................B63c 11/04
[58] Field of Search ......................2/2.1 A, 2, 2.1 R

[56] References Cited

UNITED STATES PATENTS

| | | | |
|---|---|---|---|
| 2,433,768 | 12/1947 | Krupp | 2/2.1 A |
| 3,242,499 | 3/1966 | Fonda-Bonardi | 2/2.1 R |
| 3,411,157 | 11/1968 | Rabenhorst | 2/2.1 R |
| 3,432,860 | 3/1969 | Durney | 2/2 |
| 3,562,809 | 2/1971 | Hardy et al. | 2/2.1 A |
| 3,621,542 | 11/1971 | Getchell | 2/2.1 A X |

OTHER PUBLICATIONS

Article "Nomex"; Knitted Outerwear Times, July 6, 1970 (Vol. 39, No. 28) pgs. 28, 29, 58 & 59.

Primary Examiner—Alfred R. Guest
Attorney—Harry A. Herbert, Jr. et al.

[57] ABSTRACT

An improved, single plane, soft joint for use as elbow and knee joint systems in a pressure suit wherein increased comfort and freedom of motion is achieved by constructing the joint-covering portions of the suit with fabrics of differing degrees of extensibility on the compression and extension sides of the joint and by applying a tapered band near the pivotal plane of the joint to maintain constant volume at all degrees of flexure.

6 Claims, 5 Drawing Figures

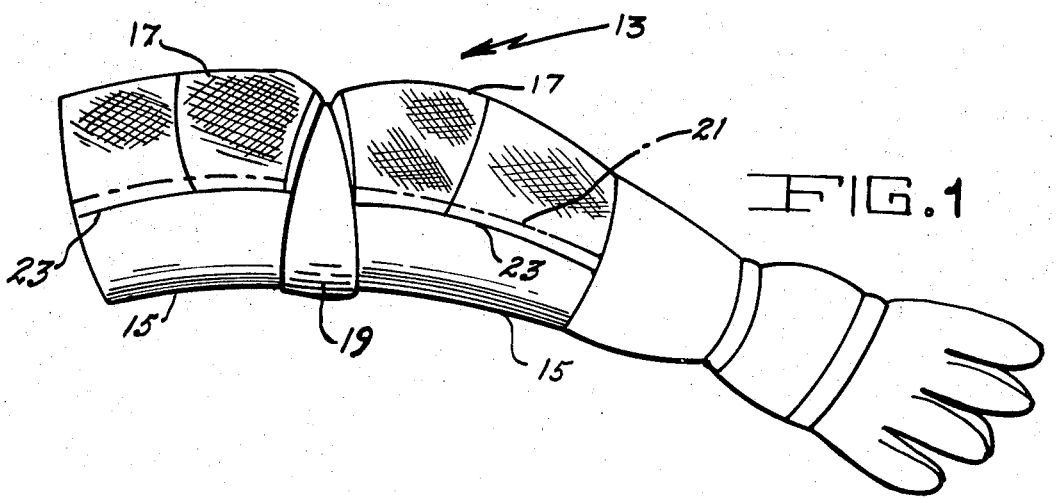

PRESSURE SUIT JOINT SYSTEM

BACKGROUND OF THE INVENTION

This invention relates to an improvement in the knee and elbow joints in pressure suits for high altitude environment and, more particularly, the invention is concerned with providing a more comfortable pressure suit in which the wearer has a relatively high degree of mobility especially at the knee and elbow joints. The necessary freedom of motion is provided by using materials having different physical properties in the compression and extension sides of the joints and by the use of a unique transfer band which operates to transfer the volume of gas across the joint in the pressure suit by moving transversely from the compression to the extension side of the joint.

During high altitude and space flight, it is well known that personnel in the craft must be protected from the hazards caused by the rapid reduction of pressure on the body surface. This is generally accomplished by encasing the person in an inflatable pressure suit so that, in cases where pressurized cabins or cockpits are punctured accidentally or where bail-out becomes necessary, the wearer can be protected. Many different pressure flight suits have been developed for providing this protection. One of the most important considerations in the design of pressure suits is the factor of mobility. To be effective, the suit must provide the wearer with necessary protection from environmental pressure loss while at the same time being reasonably comfortable and providing the freedom of motion required for him to carry out his tasks within and without the aircraft.

The effectiveness of the pressure suit is basically dependent on the efficiency of the operation of the body joints of the wearer, particularly the knee and elbow joints. Heretofore, when the suit was pressurized, a large percentage of the mobility of the wearer was lost because of the extra effort required to bend or flex the knee and elbow joints. This stiffness is caused by the internal pressure which keeps the material of the arms and legs taut and inflexible. The pressure occurs in the area between the wall of the garment and the body of the wearer and operates to restrict the motion at the joints. It would be especially desirable and a step forward in the art to provide a pressurized suit wherein the wearer is completely protected from the well-known hazards of high altitude aircraft and space flights while at the same time maintaining high freedom of motion at the various body joints to perform the complex tasks inherent in this type of activity. In addition, the suit should be comfortable during sitting, standing and walking, especially for extensive flights of comparatively long duration.

SUMMARY OF THE INVENTION

The present invention provides a pressure suit joint system which utilizes improved, single plane, soft joints fabricated of unique expandable fabric materials and having volume transfer features. The initial volume of the joint is locally reduced by distorting the extension side of the joint with a tapered transfer band. As the joint is flexed, a volume of gas transfers directly across the longitudinal axis from the compression side to the extension side of the joint. The transverse movement of the transfer band transfers the volume of gas because the band area on the extension side of the joint is less than the band area on the compression side thereby causing a convolute effect to be produced by the high local stresses which deform the material and cause it to roll over the band in the region of the joint.

By locating the transfer band slightly above the elbow for the elbow joint, a smaller cross-sectional diameter may be used without restricting the limb. The bending or flexion torque is substantially reduced with the decreased diameter and by the use of reoriented woven fabric panels of reduced size on the compression side of the joint. This arrangement serves to reduce the torque required to straighten the limb.

Accordingly, it is an object of the invention to provide a joint system for a pressure suit wherein maximum mobility is achieved while still maintaining complete integrity of pressure.

Another object of the invention is to provide an inflatable pressure suit wherein the natural tendency under internal pressure of stiffness and rigidity is overcome by a unique construction of the elbow and knee joints to allow for maximum freedom of movement with a minimum of human energy expenditure.

A further object of the invention is to provide a pressure suit joint system wherein the joint-covering portions of the suit are constructed of fabrics having differing degrees of extensibility on the compression and extension sides of the joint.

A still further object of the invention is to provide a pressure suit elbow and knee joint having a tapered transfer band which is wide on the compression side and narrow on the extension side of the joint so as to maintain approximate constant volume when the joint is flexed.

Another still further object of the invention is to provide a pressure suit having an elbow joint with a transfer band located slightly above the elbow area to allow a smaller cross-sectional diameter without restricting the activity of the limb thereby reducing the flexion torque of the elbow joint.

Another object of the invention is to provide an improved elbow and knee joint for a pressure suit wherein the extension side of the joint includes two panels of a reoriented woven fabric such as marquisette so that the joint can be manipulated with a minimum of effort.

These and other objects, features and advantages will become more apparent after considering the following description taken in conjunction with the annexed drawings and appended claims.

DESCRIPTION OF THE DRAWINGS

FIG. 1 is an enlarged view of an elbow joint in a pressure suit joint system according to the invention; and FIGS. 2a, 2b, 2c and 2d are views of the elbow joint at various degrees of flexure showing the changes in configuration of the transfer band and the extension panels.

DESCRIPTION OF A PREFERRED EMBODIMENT

Referring now to the drawings, there is shown a pressure suit joint system adapted for use with the elbow joint in a pressure suit. Although an elbow joint is shown in the drawing, the invention is equally suitable for use with a knee joint. There is shown a single plane, soft joint which employs unique expandable fabric materials and volume transfer features.

As shown in FIG. 1, the joint system designated generally by the reference numeral 13 includes a single panel 15 of inextensible material such as Nomex on the compression side and two panels 17 of an extensible material such as reoriented marquisette on the extension side. A tapered transfer band 19, about two inches wide on the compression side and three-quarters of an inch wide on the extension side, is employed to maintain approximate constant volume as the joint 13 is flexed. The circumference of the transfer band 19 is made approximately ninety percent of the joint circumference to produce an initial constriction in the pressurized joint 13.

The initial volume of the joint 13 is locally reduced by distorting the extension side of the joint with the transfer band 19. As the joint 13 is flexed, a volume of gas transfers directly across the longitudinal axis 21 from the compression side to the extension side of the joint. The transverse movement of the transfer band 19 transfers this volume as shown in FIG. 2.

With reference to FIG. 2, a convolute effect is present on the extension side of the straightened joint. This occurs because the band area on the extension side of the joint 13 is less than the band area on the compression side. This produces higher unit stresses on the extension side than on the compression side. The high local stresses tend to deform the material and cause it to roll over the band 19 in that region and thereby produce the convolute effect.

Generally, separate pressure barriers have been employed in the hereinbefore described joint system. Such pressure barriers may be fabricated of silicone rubber, neoprene, polyurethane rubber, or the like. This pressure barrier, when used, is also reinforced in the same relative areas by reoriented fabric such as marquisette. Alternatively, the restraint layer may be impregnated with any of the suitable pressure barrier materials.

By locating the transfer band 19 in the proper position, which is slightly above the elbow for the elbow joint, a smaller cross-sectional diameter may be used without restricting the limb. Flexion torque is substantially reduced with the decreased diameter. Longitudinal restraints 23 are offset about one-eighth inch from the longitudinal axis 21 toward the compression side to aid in the reduction of flexion torque. The joint 13 is generally stable in all positions with the neutral pressurized position at an angle of about 30°. Reoriented marquisette panels 17 of reduced size may be used on the compression side of the joint to reduce the torque required to straighten the limb.

Although the invention has been illustrated in the accompanying drawings and described in the foregoing specification in terms of a preferred embodiment thereof, the invention is not limited to this embodiment or to the particular configuration mentioned. It will be apparent to those skilled in the art that, although our pressure suit joint system is designed for a single plane, substantially greater mobility is achieved because of the possibility of increased rotation about the upper arm axis with the elbow bent at ninety degrees.

Having thus set forth and disclosed the nature of our invention, what we claim and desire to secure by Letters Patent of the United States is:

1. In a pressure suit for incasing the wearer's body in an air-pressurized environment during high altitude flight, a flexible joint having a compression and an extension side, said flexible joint comprising two panels of inextensible material on the compression side of said joint, one of said panels of inextensible material being positioned above the joint area and the other of said panels of inextensible material being positioned below the joint area, two panels of extensible material on the extension side of said joint, one of said panels of extensible material being positioned above the joint area and the other of said panels of extensible material being positioned below the joint area, the longitudinal edges of said panels of extensible material being joined to the longitudinal edges of said inextensible panels to form a substantially tubular member, a tapered transfer band positioned around the joint area at the pivotal plane, said transfer band having its narrower tapered portion operatively joined to the adjacent circumferential edges of said extensible panels at the extension side of said joint and its full width portion in contact with the inextensible panels on the compression side of said joint, such that substantially constant volume is maintained when the joint is flexed.

2. The pressure suit flexible joint defined in claim 1, wherein the inextensible material on the compression side of said joint is Nomex.

3. The pressure suit flexible joint defined in claim 2, wherein the two panels of extensible material on the extension side of said joint are fabricated of reoriented marquisette.

4. The pressure suit flexible joint defined in claim 3 wherein the transfer band is positioned slightly above the joint of the wearer to permit the use of a smaller cross-sectional diameter transfer band.

5. The pressure suit flexible joint defined in claim 4 wherein the circumference of the tapered transfer band is ninety percent of the joint circumference thereby producing an initial constriction in the joint area and substantially reducing the flexion torque.

6. The pressure suit flexible joint defined in claim 5 wherein longitudinal restraints are positioned along the length of the tubular member in which the joint is located, said longitudinal restraints being offset from the axis of the tubular member toward the compression side of the joint to aid in the reduction of flexion torque.

* * * * *